3,278,621
PROCESS FOR PREPARING POLYALKYL-
TETRALINS
Jan Stofberg, Bertus van der Wal, and Kees N. Nieuwland, Amersfoort, Netherlands, assignors to Polak's Frutal Works, Inc., Middletown, N.Y., a corporation of New York
No Drawing. Filed Mar. 16, 1964, Ser. No. 352,291
Claims priority, application Netherlands, Mar. 21, 1963, 290,503
12 Claims. (Cl. 260—668)

This invention relates to the preparation of polyalkyltetralins and, more particularly, to the preparation of polyalkyltetralins having alkyl substituents containing from 1 to 3 carbon atoms in the 1,1,3,4,4-positions. If desired, but not necessarily, an alkyl substituent containing from 1 to 3 carbon atoms can also be present in the benzene nucleis, preferably in the 6-position.

Such polyalkyltetralins are known as intermediates for the production of musk odorants. Acylation to produce the formyl-, acetyl- or propionyl-polyalkyltetralins results in products having excellent odor in the case of alkyl substituted compounds in which the alkyl groups contain three or less carbon atoms. Acylated polyalkyltetralins in which the number of carbon atoms in the alkyl groups is greater than 3, as a general rule, have weaker musk odors than those compounds in which the number of carbon atoms in the alkyl groups is 3 or less. The musk odorants have the general formula:

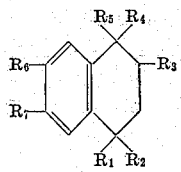

in which $R_1$, $R_2$, $R_3$, $R_4$ and $R_5$ are alkyl groups containing from 1 to 3 carbon atoms. $R_6$ is either hydrogen or such an alkyl group, while $R_7$ is an acyl group containing from 1 to 3 carbon atoms.

In numbering the compound, the 1-position in the above formula is that having the $R_1$ and $R_2$ substituents and the respective positions are numbered counter-clockwise starting with this 1-position.

It is known to react an alpha-alkyl substituted styrene with an alkene in the presence of an acid acting catalyst at temperatures of from —10° to 90° C. (United States Patent 2,851,501 granted September 9, 1958). This reaction results in the production of polyalkylindans, as well as tetralins. In this reaction the styrenes and alkenes tend to polymerize and hence the composition of the reaction product is determined by the equilibria and velocities of at least three possible competitive reactions, namely, the reaction to form polyalkylindans, the reaction to form polyalkyltetralins, and polymerization reactions between the styrenes and alkenes. Those skilled in the art familiar with this reaction have believed that the substitution of carbinols for the alkenes in this reaction would tend to complicate the reaction chiefly because a molecule of water has to be split off of the carbinol for the reaction to proceed satisfactorily. This should tend to favor the polymerization of the styrene and the alkene formed by the splitting off of a molecule of water from the carbinol, thus interfering with the production of polyalkyltetralins and resulting in poor yields of polyalkyltetralins, the desired end product.

It is a principal object of the present invention to provide a process of producing polyalkyltetralins by reacting carbinols with alkyl substituted styrenes giving good yields of polyalkyltetralins.

Other objects and advantages of this invention will be apparent from the following detailed description thereof.

In accordance with this invention, an alpha-alkyl substituted styrene, having the general formula:

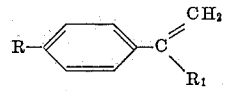

in which R is either hydrogen or an alkyl group containing from 1 to 3 carbon atoms and $R_1$ is an alkyl group containing from 1 to 3 carbon atoms, is reacted in the presence of an acid acting catalyst with pinacolylalcohol, dimethylisopropylcarbinol and methylethylisopropylcarbinol in approximately equal molar amounts to produce polyalkyltetralins.

The polyalkyltetralins thus produced when acylated in any conventional manner to produce formyl, acetyl, or propionyl polyalkyltetralins give products having excellent musk odor.

Of the styrenes employed in carrying out the reaction, alpha-methylstyrene, para-alpha-dimethylstyrene and para-ethyl-alpha-methylstyrene are preferred. The invention, however, is not limited to the use of these particular alkyl substituted styrenes. Other styrenes within the general formula above given can be used.

As noted, the condensation of the alkyl substituted styrene and the alcohol or carbinol mentioned is effected in the presence of an acid acting catalyst. Preferred catalysts are mixtures of sulfuric acid and water containing from 5% to 20% by weight of water; mixtures of glacial acetic acid and 66° Bé. sulfuric acid containing from 20% to 80% preferably about 50% sulfuric acid; and the lower alkane sulfonic acids, such, for example, as methane, ethane and propane sulfonic acids. Mixtures of two or of all three of these alkane sulfonic acids can be used. To minimize polymerization reactions, some water is employed along with the alkane sulfonic acid or mixtures thereof, usually from about 2% to 6% water, preferably about 4% water based on total mixture of alkane sulfonic acid or mixture thereof and water. Using methane sulfonic acid, preferably about 10% water is used. Employing a mixture of methane, ethane and propane sulfonic acids, from about 2% to 6%, preferably about 4% water can be incorporated.

It is preferred to conduct the reaction at a temperature within the range of from 10° to 60° C. At higher temperatures than 60° C., employing an acid acting catalyst containing, or which tends to form sulfuric acid, sulfonation of the alkyl substituted styrene to an objectionable extent may occur. To minimize such sulfonation, employing a mixture of acetic acid and sulfuric acid as the catalyst, it is preferred to operate at about a temperature of from 35° to 40° C. Using the alkane sulfonic acid as the catalyst, a reaction temperature of about 50° C. is preferred.

The reaction between para-alpha-dimethylstyrene and pinacolylalcohol is shown by the following equation:

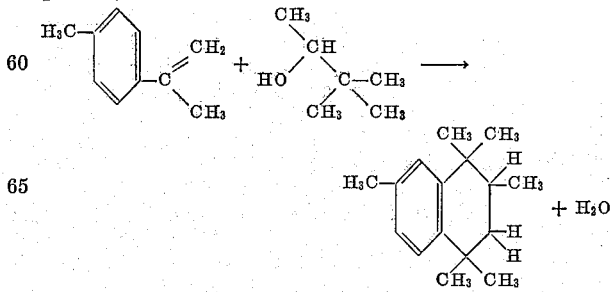

When dimethylisopropylcarbinol is reacted with para-alpha-dimethylstyrene in accordance with this invention, good yields of 1,1,3,4,4,6-hexamethyltetralin are produced.

The reaction of para-ethyl-alpha-methylsyrene with dimethylisopropylcarbinol or pinacolylaclohol gives 1,1,3,4,4-pentamethyl-6-ethyltetralin. The reaction of alpha-methstyrene with dimethylisopropylcarbinol or pinacolyl-alcohol produces 1,1,2,4,4-pentamethyltetralin.

Thus the present invention involves the discovery that pinacolylalcohol, dimethylisopropylcarbinol and methyl-ethylisopropylcarbinol are distinctive among the alcohols in their capability to react with the disclosed alkyl substituted styrenes to form polyalkyltetralin intermediates. Moreover, in that this invention involves the use of one or more of the enumerated alcohols as the reactant for reaction with the alkyl substituted styrene, it has the advantage that it eliminates the necessity of producing alkenes heretofore used and which are commonly prepared by dehydration of the corresponding alcohol. For this reason the present process results in a saving as compared with the heretofore known procedure involving the reaction of corresponding alkene with an alkyl styrene.

The following examples are given for illustrative purposes with the understanding that the present invention is not to be limited to these examples. These examples were carried out in a round bottom flask equipped with a stirrer, a thermometer, a condenser and a dropping funnel.

Example I

To a mixture of 200 grams glacial acetic acid and 200 grams sulfuric acid of 96% strength, 132 grams (1 mol) para-alpha-dimethylstyrene and 102 grams (1 mol) dimethylisopropylcarbinol were added in one hour at 40° C. After another twenty minutes stirring at the same temperature, separation of the layers was effected, followed by washing to neutral of the top layer with sodium hydroxide solution. The crude product boiled at 92° to 100° C./2 mm. of Hg and solidified on standing. Recrystallization from ethanol yielded pure 1,1,3,4,4,6-hexamethyltetralin. The melting point was 65° to 66° C.

For the acetylation 140 grams (1.05 mol) of anhydrous aluminum chloride were added with stirring to 400 grams (3.25 mols) nitrobenzene, keeping the temperature below 30° C. Through the dropping funnel 218 grams (1 mol) of the 1,1,3,4,4,6-hexamethyltetralin, dissolved in 85 grams (1.08 mol) acetylchloride and 200 grams nitrobenzene were added in three hours at ±20° C. To bring the reaction to completion stirring was continued for another half hour. Thereafter the reaction mixture was poured out into ice and concentrated hydrochloric acid. The resulting liquid, after washing to neutral with sodium acetate solution, was fractionated to yield 570 grams recovered nitrobenzene and then 7-acetyl-1,1,3,4,4,6-hexamethyltetralin which was further purified by recrystallization from ethanol. It had a boiling point of 119° C./0.2 mm. and a melting point of 55.5° to 56° C.

To prepare the aldehyde, hydrochloric acid gas was bubbled through a mixture of 18.6 grams (0.14 mol) anhydrous zinc chloride, 22.4 grams (0.75 mol) paraformaldehyde and 250 grams (1.15 mol) 1,1,3,4,4,6-hexamethyltetralin at 88° to 92° C. After three hours the gas absorption ceased. Separation of the layers and washing to neutral of the top layer with water and dilute sodium hydroxide solution, followed by fractionation under reduced pressure, gave a forerun of recovered hexamethyltetralin and thereafter 7-chloromethyl-1,1,3,4,4,6-hexamethyltetralin. This compound had a boiling point of 121° to 130° C./0.5 mm. and a melting point, after recrystallization from ethanol, of 91° to 93° C.

7-formyl-1,1,3,4,4,6-hexamethyltetralin was prepared by two hours refluxing of 42 grams (0.16 mol) 7-chloromethyl-1,1,3,4,4,6-hexamethyltetralin with a mixture of 44 grams (0.31 mol) hexamethylenetetramine, 65 ml. glacial acetic acid and 65 ml. water. After some cooling and after addition of 25 ml. hydrochloric acid (36% strength) the liquid was again refluxed for 20 minutes. The cold reaction mixture was diluted with water and extracted with benzene. Washing to neutral and removal of the solvent by distillation yielded the crude aldehyde. The product had a boiling point of 125° to 140° C./1 mm. and the pure compound, obtained by recrystallization from methanol-ethanol, had a melting point of 91.5° to 93° C.

The ketone as well as the aldehyde are powerful musk odorants.

Example II

Repetition of the first part of the above example substituting pinacolylalcohol (1 mol) for the dimethylisopropylcarbinol gave pure 1,1,3,4,4,6-hexamethyltetralin. The yield with dimethylisopropylcarbinol was somewhat higher than that obtained with pinacolylalcohol.

Example III 146 grams (1 mol) para-ethyl-alpha-methylstyrene were reacted with 102 grams (1 mol) dimethylisopropylcarbinol following the procedure described in Example I. After fractionation it gave 1,1,3,4,4-pentamethyl-6-ethyltetralin as a liquid having a boiling point of 106° to 108° C./2 mm. and $n_D^{20}$ 1.515–1.517.

Application of the acetylation procedure of Example I to this hydrocarbon yielded 7-acetyl-1,1,3,4,4-pentamethyl-6-ethyltetralin. The boiling point was 128° to 133° C./0.5 mm. and after recrystallization from ethanol it had a melting point of 60° to 61° C.

Example IV

The substitution of 1 mol of pinacolylalcohol for the 1 mol of dimethylisopropylcarbinol in Example III gave the same reaction product, namely, 1,1,3,4,4-pentamethyl-6-ethyltetralin as a liquid having substantially the same boiling point and refractive index as noted above for this product.

Example V

Using the procedure of Example I, 1,1,2,4,4-pentamethyltetralin was obtained by reacting 118 grams (1 mol) alpha-methylstyrene with 102 grams (1 mol) dimethylisopropylcarbinol. It yielded a product, the bulk of which was the desired pentamethyltetralin. It was a liquid having a boiling point of 81°–91° C./2 mm. and $n_D^{20}=1.514$–1.517.

Acetylated as described in Example I, it yielded acetyl-1,1,2,4,4-pentamethyltetralin, a mixture of 2-isomers one of which with the acetyl group in position 6, the other one in position 7. This product also has a strong musk odor. The boiling point was 140° C./2 mm. and $n_D^{20}=1.534$–1.538.

Example VI

The substitution of 1 mol of pinacolylalcohol for the 1 mol of dimethylisopropylcarbinol in Example V gave the same product, namely, pentamethyltetralin, having substantially the same physical constants as noted above.

Example VII

A mixture of 132 grams (1 mol) of para-alpha-dimethylstyrene and 102 grams (1 mol) dimethylisopropylcarbinol was added dropwise to 400 grams methanesulfonic acid (90% sulfonic acid and 10% water) over one hour and keeping the temperature at 45° to 50° C. After another 20 minutes stirring the liquid was processed as described in Example I. Fractionation yielded 1,1,3,4,4,6-hexamethyltetralin, boiling at 90° to 100° C./2 mm. and melting at 65° to 66° C. after recrystallization from ethanol.

Example VIII

The substitution of 1 mol of pinacolylalcohol for the 1 mol of dimethylisopropylcarbinol gave substantially the same product, namely, 1,1,3,4,4,6-hexamethyltetralin.

The substitution of ethanesulfonic acid and/or propanesulfonic acid, containing from 2% to 6% water, or mixtures of such sulfonic acids, desirably containing about 4% water for the methanesulfonic acid—water mixture

What is claimed is:

1. A process for preparing polyalkyltetralins, which comprises reacting a styrene hydrocarbon of the formula:

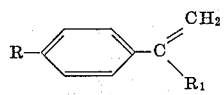

in which R is selected from the group consisting of hydrogen and an alkyl group containing from 1 to 3 carbon atoms and $R_1$ is an alkyl group containing from 1 to 3 carbon atoms with a carbinol selected from the group consisting of dimethylisopropylcarbinol, methylethylisopropylcarbinol or pinacolylalcohol in the presence of an acid acting catalyst.

2. The process of claim 1, in which the styrene hydrocarbon is para-alpha-dimethylstyrene.

3. The process of claim 1, in which the styrene hydrocarbon is alpha-methylstyrene.

4. The process of claim 1, in which the styrene hydrocarbon is para-ethyl-alpha-methylstyrene.

5. The process of claim 1, in which the carbinol is pinacolylalcohol.

6. The process of claim 1, in which the carbinol is dimethylisopropylcarbinol.

7. The process of claim 1, in which the acid acting catalyst is a mixture of glacial acetic acid and sulfuric acid containing from 20% to 80% by weight of sulfuric acid.

8. The process of claim 1, in which the acid catalyst is a mixture of sulfuric acid and water containing from 80% to 95% by weight of acid.

9. The process of claim 1, in which the acid acting catalyst is methanesulfonic acid.

10. The process of claim 1, in which the acid acting catalyst is ethanesulfonic acid.

11. The process of claim 1, in which the acid catalyst is propanesulfonic acid.

12. The process of claim 1, in which the acid acting catalyst is a mixture of at least two of methane, ethane and propane sulfonic acids.

References Cited by the Examiner

UNITED STATES PATENTS 2,851,501   9/1958   Benz et al. ---------- 260—668

DELBERT E. GANTZ, *Primary Examiner.*

G. E. SCHMITKONS, *Assistant Examiner.*